United States Patent [19]

Mizokami et al.

[11] Patent Number: 4,916,683
[45] Date of Patent: Apr. 10, 1990

[54] OPTICAL RECORDING/REPRODUCING APPARATUS WITH MEANS TO SHIFT LIGHT BEAM PERIODICALLY TO PREVENT RECORD MEDIUM DETERIORATION

[75] Inventors: Takuya Mizokami; Shinichi Arai, both of Odawara, Japan

[73] Assignee: Hitachi, Ltd., Tokyo, Japan

[21] Appl. No.: 304,899

[22] Filed: Feb. 1, 1989

Related U.S. Application Data

[63] Continuation of Ser. No. 130,099, Dec. 7, 1987, abandoned.

[30] Foreign Application Priority Data

Dec. 12, 1986 [JP] Japan ............................... 61-294946

[51] Int. Cl.⁴ ........................... G11B 7/85; G11B 7/00
[52] U.S. Cl. ....................................... 369/33; 346/76 L; 369/54; 369/58; 369/116; 369/121; 358/342

[58] Field of Search ............. 358/342; 346/76 L, 135; 369/30, 33, 53–58, 99, 109, 116, 119, 121, 122; 235/454, 455

[56] References Cited

U.S. PATENT DOCUMENTS

| 4,538,257 | 8/1985 | Klinger ............................ 369/54 X |
| 4,611,248 | 9/1986 | Honj et al. ........................ 358/342 |
| 4,611,315 | 9/1986 | Ogino .................................. 369/33 |

FOREIGN PATENT DOCUMENTS 2172138 9/1986 United Kingdom .

Primary Examiner—Robert L. Richardson
Attorney, Agent, or Firm—Kenyon & Kenyon

[57] ABSTRACT

When it is detected that the light spot stays in a same track for a time exceeding a predetermined length of time, the light spot is moved to any other track. Thus, the light spot is prevented from staying on a same track for a long time without recording/reproducing data.

22 Claims, 4 Drawing Sheets

OPTICAL RECORDING/REPRODUCING APPARATUS WITH MEANS TO SHIFT LIGHT BEAM PERIODICALLY TO PREVENT RECORD MEDIUM DETERIORATION

This application is a continuation, of application Ser. No. 130,099, filed 12/7/87 now abandoned.

BACKGROUND OF THE INVENTION (a) Field of the Invention:

The present invention relates to a method and apparatus for optical recording and reproduction, and more particularly to a method and apparatus for optical recording and reproduction in which the light spot is prevented from staying on a same track on an optical disk for a time longer than a predetermined one, thereby preventing the optical disk from being deteriorated while maintaining the projected power of a light spot at a high level.

(b) Description of the Related Art:

In the conventional optical recording/reproduction apparatus, after a recording or reproduction is made onto or from a track on an optical disk, the light spot is kept in a position on a track to or from which the recording or reproduction is finally made. It should be noted here that the maximum read power of light spot with which the light spot may be continuously projected without deteriorating the surface of an optical disk depends upon the type of the disk. Therefore, an optical disk of which the maximum read power is low must be used with an optical recording/reproduction apparatus of which the read power of light spot is low. Assume now that an optical disk of low maximum read power is used in an optical recording/reproduction apparatus of which the read power of light spot is high. Since the light spot stays on a same track, the pit pattern, including sector marks, ID parts, data parts, etc. provided on the track are deteriorated, and finally a hole is made in the surface of the optical disk with the result that no data recording/reproduction will be possible.

Therefore, in case optical disks of different types are used in the conventional optical recording/reproduction apparatus, it is necessary to set low the read power of the light spot of the apparatus according as low as the maximum read power of to one of the optical disks of having the lowest maximum read power is the lowest.

In the optical recording/reproduction apparatus of which the read power is set low as in the above, however, the read signal is so weak that the tracking servo system to position the light spot on a track and the auto-focus servo system to focus the light spot are unstable with the result that the signal-to-noise ratio of reproduced data is low.

SUMMARY OF THE INVENTION

The present invention has a primary object to provide a method and apparatus for optical recording and reproduction in which even when an optical disk of which the maximum read power is set low is used, it is not necessary to set low the read power of light spot of the apparatus.

According to another aspect of the present invention, a method and apparatus for optical recording and reproduction is provided of which the tracking servo system and the auto-focus servo system work stably even when an optical disk of which the maximum read power is set low is used in the apparatus.

According to a still another aspect of the present invention, a method and apparatus for optical recording and reproduction is provided which provides a reproduced data of a high signal-to-noise ratio even when an optical disk of which the maximum read power is set low is used in the apparatus.

According to a yet another aspect of the present invention, a method and apparatus for optical recording and reproduction is provided in which the light spot is prevented from staying on a same track for a time longer than the predetermined one without doing any write or read.

According to the present invention, it is detected whether or not the light spot is staying on a same track for a time longer than a predetermined one without doing any write or read, and if so, the light spot is moved to any other track or any area independent of the data recording/reproduction.

These and other objects and advantages of the present invention will be better understood from the ensuing description made, by way of example, of the preferred embodiments with reference to the drawings.

DETAILED DESCRIPTION

Figure 1:
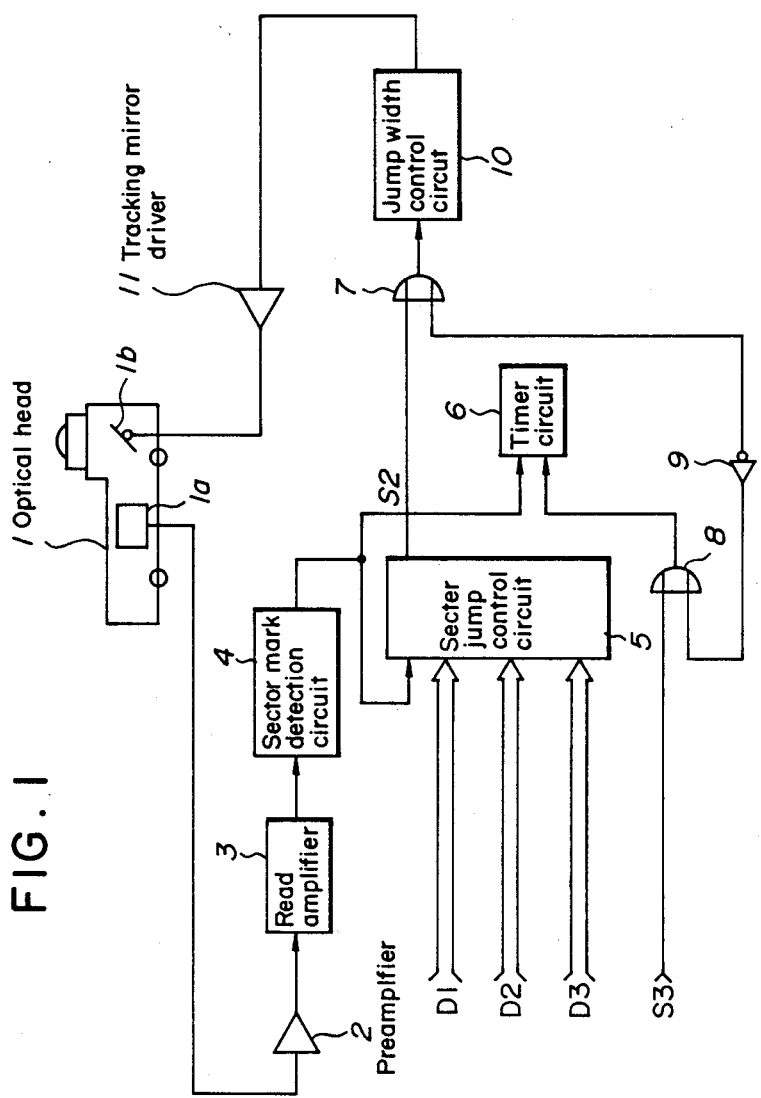
FIG. 1 is a block diagram showing one embodiment of the present invention.

FIG. 1 is a block diagram showing a first embodiment of the present invention. As seen from FIG. 1, there is provided an optical head 1 to project a laser beam onto a track (not shown) on an optical disk in order to write or read data, and a Galvano mirror 1b to position the light spot of the laser beam on the track. The reflected light from the optical disk is received by the Galvano mirror 1b, and a read signal is delivered from a read signal detecting means 1a including a photoelectric converter, etc. The construction of the above-mentioned optical head 1 is well known, and so will not be further explained herein.

Figure 2:
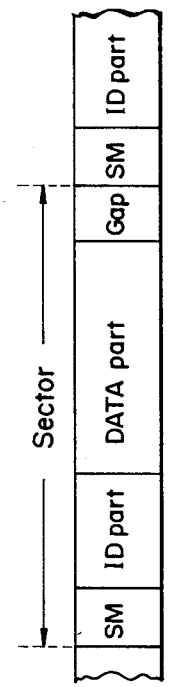
FIG. 2 is an explanatory drawing showing the configuration of a sector present in the track on an optical disk.

The read signal from the read signal detecting means 1a is supplied to a read amplifier 3 through a preamplifier 2 of which the output is supplied to a sector mark detection circuit 4 where a sector mark signal S1 indicating the top of each sector is detected. Namely, a track on the optical disk consists of plural sectors as is well known. FIG. 2 shows the configuration of one such sector. As seen, the sector mark is placed at the top of each sector. The detected sector mark signal S1 is supplied to a sector jump control circuit 5 and a timer circuit 6, respectively.

In addition to the sector mark signal S1, the sector jump control circuit 5 is supplied with a load sector number D1, a jump sector number D2, and a number of follows D3. The load sector number D1 is a sector number of a sector where the light spot projected from the optical head 1 is currently passing. The address of a sector is determined by a track number and sector number and stored in the ID part shown in FIG. 2. Also the jump sector number D2 is as follows. That is to say, to position the light spot in a same track on an optical disk having spiral tracks, it is necessary to displace the light spot one track inwardly or outwardly at each rotation of the optical disk. This displacement is called "sector jump" and a specified sector for a sector jump is called "jump sector". Thus, the jump sector number D2 means of the sector number of a jump sector and it has a peculiar value to each track. The number of follows D3 indicates the number of tracks from/to which data is read and written. Namely, when data read/write is continuously done with respect to a number n of tracks, the number of follows D3 is "n−1". On the other hand, in case data read/write is done with respect to only one track, the number of follows is "0". The load sector number D1, jump sector number D2 and number of follows D3 are delivered from a read/write controller (not shown) in a well-known manner.

Receiving a sector mark signal S1, load sector number D1, jump sector number D2 and number of follows D3, the sector jump control circuit 5 operates as will be described below:

Each time a sector mark signal S1 is supplied, "1" is added to the load sector number D1 as initial value. Therefore, the result of this addition always indicates the sector number of a sector where the light spot is currently passing. The result of addition is compared with the jump sector number D2. When the comparison shows a coincidence between them, it is detected that the light spot is positioned in the jump sector, and a jump sector detection signal is produced. Assume that the number of the jump sector detection signals thus delivered is N. A value (N−1) is compared with the number of follows D3 and when there is a conincidence between these values, a sector jump command signal S2 is delivered. Therefore, when the number of follows D3 is "0", the sector jump command signal S2 is delivered upon detection of one jump sector. On the contrary, when the number of follows D3 is not "0", namely, in case data read/write is done with respect to a succession of tracks, the sector jump command signal S2 is inhibited from being generated until jump sectors as many as a number of the number of follows D3 plus 1 are detected. Thus, the sector jump for each track is inhibited, thereby enabling continuous data read/write with respect to a plurality of tracks.

Figure 3:
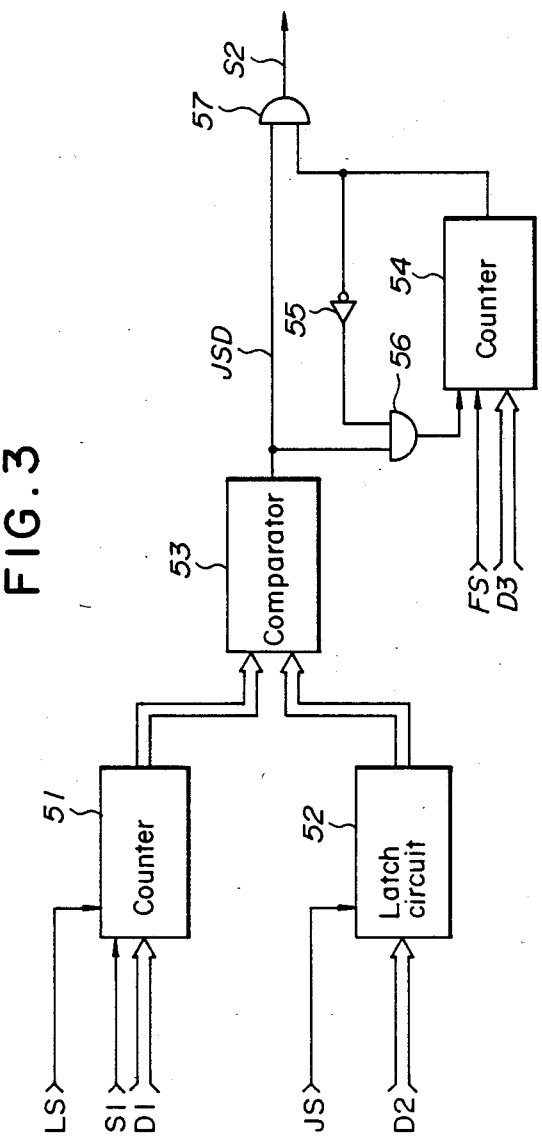
FIG. 3 is a block diagram showing in detail the sector jump control circuit of FIG. 1.

FIG. 3 is a block diagram showing one example of the sector jump control circuit 5. As seen from FIG. 3, the load sector number D1 is supplied to a counter 51 where it is set to an initial value with the input timing of a load sector set signal LS. Subsequently, the counter 51 counts up each time a further sector mark signal S1 is supplied. Also there is provided a latch circuit 52 which latches the jump sector number D2 with the input timing of a jump sector set signal JS. The count of the counter 51 and the output from the latch circuit 52 are supplied to a comparator 53 where they are compared with each other. Only when they show a coincidence between them as the result of the comparison does the comparator 53 deliver a jump sector detection signal JSD. On the other hand, the number of follows D3 is set in a counter 54 with the input timing of a number-of-follows set signal FS. The counter 54 is a down-counter and delivers a logical "1" when its count is "0". There is provided an AND circuit 57. Only when the count of the counter 54 is "0", the AND circuit 57 delivers as sector jump command signal S2 the jump sector detection signal JSD delivered from the comparator 53. Therefore, in case the number of follows D3 set in the counter 54 is "0", the sector jump command signal S2 is produced when the jump sector is detected once. When the number of follows D3 is not "0", the output of the counter 54 is a logic "0", so that the AND circuit 57 is turned off while another AND circuit 56 is turned on under the action of an inverter 55. So, even if a jump sector detection signal JSD is delivered from the comparator 53, no sector jump command signal S2 is delivered, while the counter 54 counts down each time a jump sector detection signal JSD is delivered. When the number of jump sector detection signals JSD equalling the number of follows D3 plus 1 are delivered so that the count of the counter 54 is "0", the counter 54 delivers a logic "1". Therefore, the AND circuit 57 will deliver a jump sector detection signal JSD as sector jump command signal S2, and also the AND circuit 56 is subsequently turned off. It should be noted here that the above-mentioned load sector set signal LS, jump sector set signal JS and number-of-follows set signal FS are delivered from the read/write control circuit (not shown).

As seen from FIG. 1, the sector jump command signal S2 delivered from the sector jump control circuit 5 is supplied to an AD circuit 7 which will provide a sector jump command signal S2 to a jump width control circuit 10 if a logic "1" is delivered from the timer circuit 6. Thus, the jump width control circuit 10 and a tracking driver circuit 11 are put into operation to make a sector jump.

In this embodiment, to prevent the light spot from being positioned in a same track for a long time in the drive not-selected state, the AND circuit 7 is provided to control the on/off of the sector jump command signal S2. The on/off of the AND circuit 7 is controlled as follows by the timer circuit 6, an OR circuit 8 and an inverter 9:

Receiving the sector mark signal S1 delivered from the sector mark detection circuit 4 and a drive-selected signal S3, the timer circuit 6 operates as follows. It should be noted that the drive-selected signal S3 is a signal which takes a logic "1" when the apparatus is doing data write/read with respect to the optical disk (this will be referred to as "drive-selected state" hereinafter), and a logic "0" when the apparatus is doing no data write/read (this will be referred to as "drive not-selected state" hereinafter). The drive-selected signal S3 is delivered, for example, from the optical disk controller (not shown). The timer circuit 6 comprises, for example, a counter which counts up each time a sector mark signal S1 is supplied and is reset when the drive-selected signal S3 takes a logic "1" (namely, when the drive-selected state is established). Further, the timer circuit 6 delivers a logic "1" until it counts up to a predetermined value, and delivers a logic "0" when it has counted the predetermined value. Therefore, after the drive-selected state is established, the AND circuit 7 is kept on until the timer circuit 6 counts a predetermined value. After the timer circuit has counted that predetermined value, the AND circuit 7 will be turned off. Assume that the above-mentioned predetermined value is 256. When 256 sector mark signals S1 are supplied and the timer circuit 6 counts 256, the AND circuit 7 is moved from the on state to the off state. If the AND circuit 7 gets the off state, no sector jump command signal S2 is supplied to the jump width control circuit 10, so that the sector jump operation is inhibited.

In case one track consists of 32 sectors, the above-mentioned predetermined value "256" corresponds to eight rotations of the optical disk. Namely, in the above-mentioned example, the apparatus will not do any data read/write (drive not-selected state) and when the optical disk rotates eight full turns, the sector jump is inhibited. As the result, the optical disk is prevented from staying on a same track for a long time.

As shown in FIG. 1, there are also provided an OR circuit 8 and an inverter 9 which serve as will be described below. Namely, when the timer circuit 6 has counted a predetermined value and delivers a logic "0", this logic "0" is inverted into a logic "1" by the inverter 9. As the result, the logic "1" is supplied through the OR circuit 8 to the timer circuit 6 which in turn will be reset.

Having been described in connection with the first embodiment in the foregoing, the timer circuit 6 is a counter which counts sector mark signals S1 delivered. However, the present invention is not limited to this embodiment, but the timer circuit 6 may be a means of counting a predetermined time after, for example, the drive-selected signal S3 becomes a logic "1". Also, in the description made above, the AND circuit 7 is to turn off the sector jump command signal S2. However, the present invention is not limited to this arrangement, but any other gate circuit may be used in combination with the timer circuit 6 to take the place of the AND circuit 7.

Figure 4:
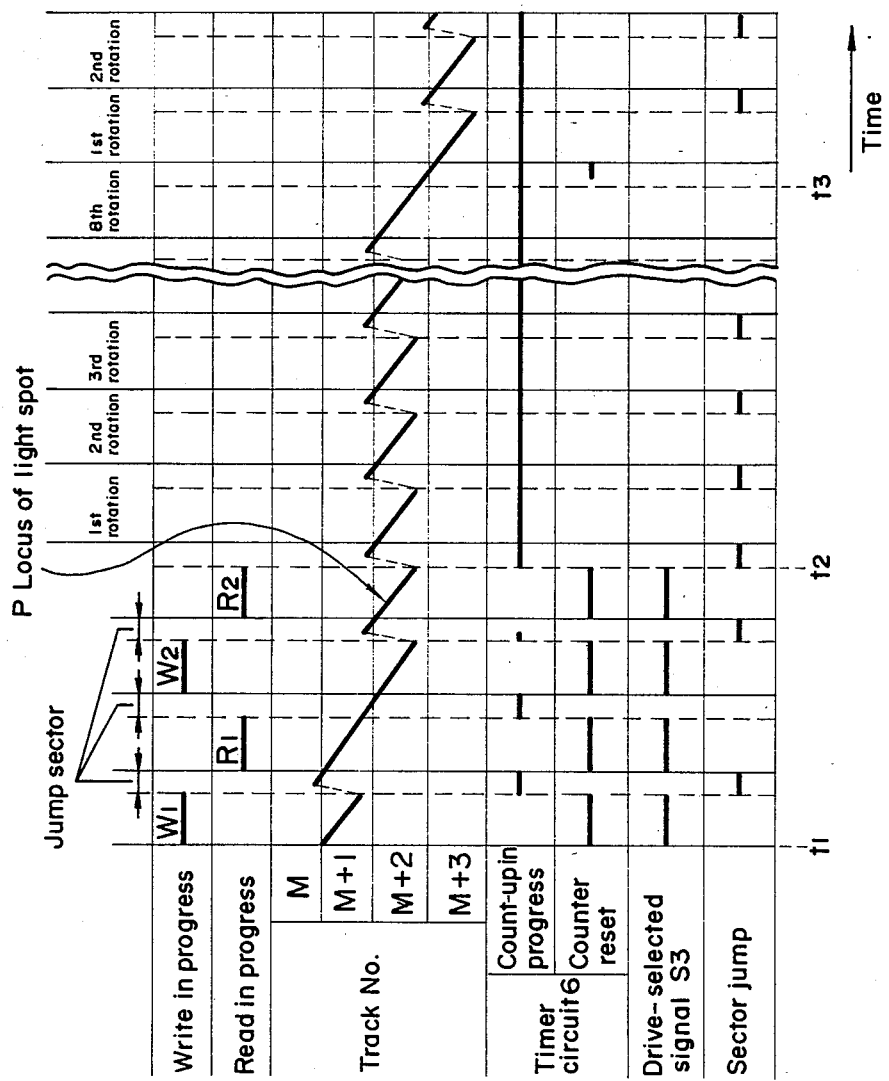
FIG. 4 is an exemplary drawing showing the operation of the first embodiment in FIG. 1.

FIG. 4 is an explanatory drawing showing the operation of the above-mentioned embodiment. In this Figure, the solid lines shown in the "write in progress" row indicate the timings of the write by the apparatus, the solid lines in the "read in progress" row indicate the timings of the read by the apparatus, and the solid lines in the "sector jump" row indicate the timings of the sector jump of the light spot. In FIG. 4, the reference symbol P indicates the locus or pass of the light spot, namely, the pass of the light spot from a track No. (M+1) to a track No. (M+3). The solid lines in the "count-up in progress" row indicate the timings of the count-up by the counter composing the timer circuit 6, and the lines in the "counter reset" row indicate the timings of the resetting of the counter. Further, the solid lines in the "drive-selected signal S3" row indicate the output timings of the drive-selected signal S3.

As seen from FIG. 4, write/read with respect to the tracks (M+1) and (M+2) are effected for a time from t1 to t2. After passing by the time t2, the apparatus does not effect either read or write while the positioning of the light spot in the track (M+2) is started. Namely, at the time t2, the drive not-selected state begins and as having been previously described, the timer circuit 6 starts counting sector mark signals S1. At the time t3, the count of the timer circuit 6 attains "256", namely, it is detected that the optical disk has rotated eight full turns in the drive not-selelected state. Then, the sector jump command signal S2 is turned off, and thus the light spot is inhibited from doing a sector jump. Hence, the locus or pass P of the light spot shifts from the track (M+2) to the track (M+3) at the time t3 as shown in FIG. 4.

In the above-mentioned embodiment, the sector jump is inhibited after the optical disk has rotated eight full turns, but the present invention is not limited to such a number of turns of the optical disk and this number of optical disk rotations may be any arbitrary one.

Figure 5:
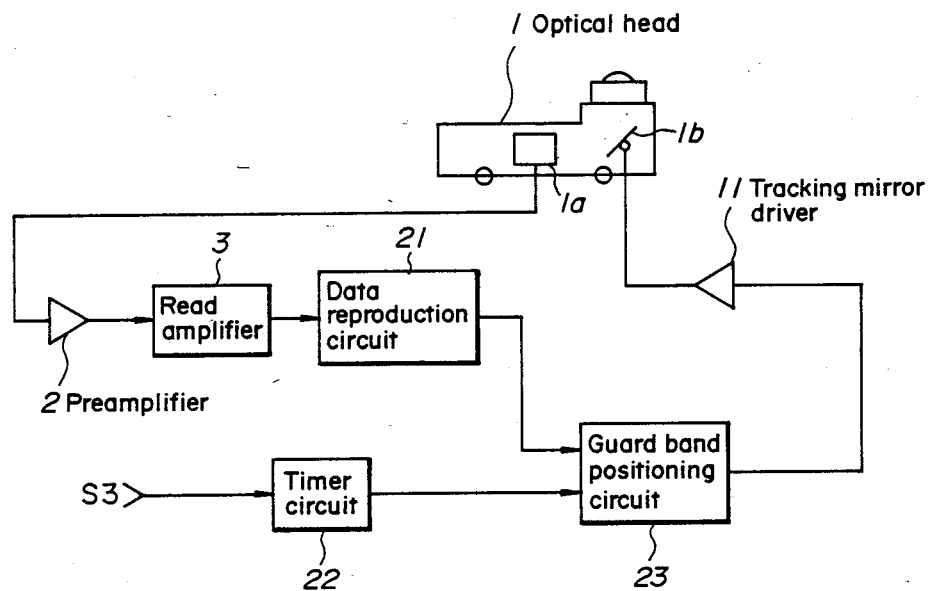
FIG. 5 is a block diagram showing a second embodiment of the present invention.

FIG. 5 is a block diagram showing a second embodiment of the present invention. In this Figure, the elements similar to those in the first embodiment in FIG. 1 are indicated with the reference numbers similar to those of the elements in FIG. 1. As shown in FIG. 5, the read signal delivered from the read signal detection means 1a is supplied to the read amplifier 3 through the preamplifier 2. The output from the read amplifier 3 is supplied to a data reproduction circuit 21 which provides a guard band positioning circuit 23 with an address signal indicative of the address of a sector with respect to which data read has been done. The signal indicative of the above-mentioned address is obtained by referring to the ID part shown in FIG. 2, and it consists of a track number and a sector number.

Figure 6:
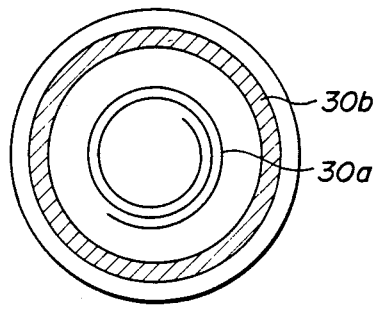
FIG. 6 is a plan view showing an optical disk.

The drive-selected signal S3 is supplied to a timer circuit 22 which will, when detects that a predetermined time has passed after the drive-selected signal S3 takes a logic "0", deliver to the guard band positioning circuit 23 a signal indicating the lapse of the predetermined length of time. The guard band positioning circuit 23 determines, based on the address signal delivered from the data reproduction circuit 21, a distance to the guard band of the optical disk from a position where the light spot currently stands, and delivers to a tracking mirror driver 11 the distance as a signal indicative of the moved distance of the light spot. Receiving the above-mentioned signal, the tracking mirror driver 11 moves the Galvano mirror 1b so as to move the light spot to the guard band of the optical disk. Therefore, when the predetermined time has passed after the drive not-selected state is attained, the light spot having been positioned in the user area 30a is positioned in the guard band 30b located outside the user area as shown in FIG. 6. Subsequently, the sector jump of the light spot will be done in the guard band 30b. In case the moving distance to the guard band 30b is long, such an arrangement may be made that the optical head 1 itself is moved toward the outermost portion of the head 1. In this case, a drive, etc. of the optical head 1 can be used in place of the tracking mirror driver 11 and Galvano mirror 1b.

In the foregoing, a spiral-track optical disk has been described as an example. However, the present invention is not limited to such a spiral-track optical disk, but can be applied to an optical disk having plural concentrical tracks. For example, when a drive not-selected state has lasted for a predetermined length of time, the light spot may be jumped to any other track. To this end, the guard band positioning circuit 23 shown in FIG. 5 may be replaced with a jump circuit, for example.

According to the present invention, the light spot is not positioned on a same track for a time longer than a predetermined one, so that the read power of the light spot can be set high. Therefore, since the tracking servo system and the auto-focus servo system operate stably, a reproduced data of a high signal-to-noise ratio can be obtained.

What is claimed is:

1. A method for optically recording and reproducing data by projecting a light spot onto one of plural tracks on an optical disk, comprising the following steps of:
    detecting that the light spot stays on a same track without doing any data recording/reproduction;
    measuring a time for which the light spot stays on said same track, said step of measuring a time comprising the step of measuring the number of rotations of the optical disk; and moving the light spot to any other track when said measured time exceeds a predetermined length of time.

2. A method according to claim 1, in which said optical disk has spiral tracks.

3. A method according to claim 1, in which said optical disk has concentrical tracks.

4. A method according to claim 1, in which the number of rotations of the optical disk is measured by counting a signal generated each time the light spot passes by sectors on the track.

5. A method according to claim 4, in which said signal is a sector mark signal.

6. A method according to claim 1, in which said other track to which the light spot is moved is a track adjacent to said same track.

7. A method according to claim 1, in which said other track to which the light spot is moved exists in a guard band located outside the user area.

8. A method for optically recording and reproducing data by projecting a light spot onto an optical disk having spiral tracks each divided into plural sectors, each track having a jump sector, comprising the following steps of:

detecting that a time for which no data recording/reproduction is done exceeds a predetermined length of time;

generating a signal indicating that the light spot has passed by the sectors on a track;

detecting the sector number of a sector in which the light spot stays at a time and also detecting, based on the detected sector number and said signal, the sector number of a sector in which the light spot is currently staying;

generating a sector jump command signal when the sector number detected an the preceding step coincides with that of the jump sector; and inhibiting, when the time for which no data recording/reproduction is done at the first step is judged to exceed the predetermined length of time, said sector jump command signal from being generated.

9. A method according to claim 8, in which it is detected, by measuring the number of rotations of the optical disk, that said time for which no data recording/reproduction is done exceeds the predetermined length of time.

10. A method according to claim 9, in which the number of rotations of the optical disk is measured by counting a signal generated each time the light spot passes by plural sectors on a track.

11. A method according to claim 9, in which said signal is a sector mark signal.

12. An apparatus for optically recording and reproducing data by projecting a light spot onto one of plural tracks on an optical track, comprising:

first means for detecting that the light spot stays on a same track without doing any data recording/reproduction;

second means for measuring a time for which the light spot stays on said same track, said second means comprising means for measuring the number of rotations of the optical disk; and third means for moving the light spot to any other track when said measured time exceeds a predetermined length of time.

13. An apparatus according to claim 12, in which said optical disk has spiral tracks.

14. An apparatus according to claim 12, in which said optical disk has concentrical tracks.

15. An apparatus according to claim 12, in which the number of rotations of the optical disk is measured by counting a signal generated each time the light spot passes by the sectors present on a track.

16. An apparatus according to claim 15, in which said signal is a sector mark signal.

17. An apparatus according to claim 12, in which other track to which the light spot is moved is a track adjacent to said same track.

18. An apparatus according to claim 12, in which said other track to which the light spot is moved exists in a guard band located outside the user area.

19. An apparatus for optically recording and reproducing data by projecting a light spot onto an optical disk having spiral tracks each divided into plural sectors, each track having a jump sector, comprising:

first means for detecting that a time for which no data recording/reproduction is done exceeds a predetermined length of time;

second means for generating a signal indicating that the light spot has passed by sectors present on a track;

third means for detecting the sector number of a sector in which the light spot stays at a time and also detecting, based on the detected sector number and said signal, the sector number of a sector in which the light spot is currently staying;

fourth means for generating a sector jump command signal when the sector number detected by said third means coincides with the sector number of the jump sector; and fifth means for inhibiting, when the time for which no data recording/reproduction is done is judged to exceed the predetermined length of time, said sector jump command signal from being generated.

20. An apparatus according to claim 19, wherein said first means comprises means for measuring the number of rotations of the optical disk.

21. An apparatus according to claim 20, in which said number of rotations of the optical disk is measured by counting a signal generated each time the light spot passes by plural sectors on a track.

22. An apparatus according to claim 21, in which said signal is a sector mark signal.

* * * * *